US010289495B1

(12) United States Patent
Chakraborty et al.

(10) Patent No.: US 10,289,495 B1
(45) Date of Patent: May 14, 2019

(54) METHOD AND SYSTEM FOR PERFORMING AN ITEM LEVEL RESTORE FROM A BACKUP (71) Applicant: EMC Corporation, Hopkinton, MA (US)

(72) Inventors: Anupam Chakraborty, Bangalore (IN); Nikhil Ambastha, Bangalore (IN); Sunil Yadav, Bangalore (IN); Amarendra Behera, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 342 days.

(21) Appl. No.: 14/578,283

(22) Filed: Dec. 19, 2014

(51) Int. Cl.
*G06F 11/14* (2006.01)
*G06F 17/30* (2006.01)

(52) U.S. Cl.
CPC .... *G06F 11/1458* (2013.01); *G06F 17/30289* (2013.01); *G06F 17/30595* (2013.01)

(58) Field of Classification Search
CPC ........... G06F 11/1458; G06F 17/30289; G06F 17/30595
USPC ........................................................ 707/654
See application file for complete search history.

(56) References Cited

U.S. PATENT DOCUMENTS

| | | | | |
|---|---|---|---|---|
| 6,847,983 B2 * | 1/2005 | Somalwar | ........... | G06F 11/1435 707/624 |
| 7,552,358 B1 * | 6/2009 | Asgar-Deen | ........ | G06F 11/1435 714/15 |
| 7,797,281 B1 * | 9/2010 | Greene | ............... | H04L 61/1523 707/647 |
| 7,831,861 B1 * | 11/2010 | Greene | ............... | G06F 11/1469 707/685 |
| 7,885,938 B1 * | 2/2011 | Greene | ............... | G06F 11/1469 707/674 |
| 8,209,290 B1 * | 6/2012 | Dowers, II | ........ | G06F 17/30289 707/640 |
| 8,266,112 B1 * | 9/2012 | Beatty | ................. | G06F 11/1469 707/610 |
| 8,321,377 B2 * | 11/2012 | Michael | .............. | G06F 11/1458 707/639 |
| 8,364,640 B1 * | 1/2013 | Beatty | ................. | G06F 11/1469 707/640 |
| 8,364,648 B1 * | 1/2013 | Sim-Tang | ......... | G06F 17/30368 707/674 |

(Continued)

*Primary Examiner* — Miranda Le
(74) *Attorney, Agent, or Firm* — Womble Bond Dickinson (US) LLP (57) ABSTRACT

Methods and systems for performing an item level restore from a backup are described herein. A method starts by mounting files of content databases from storage device on management server. Content databases from storage device are from the backup. New database is created in relational database server with the mounted files of the content databases. Unattached database object is then created which includes pointing to the new database. Unattached database is not related to the content databases from the storage device. Unattached database object is then searched for source item selected for restore from content databases. Selected source item is exported from new database to a source item location in management server. Data from selected source item is then restored by importing data from the source item location to a target item location in management server.

5 Claims, 4 Drawing Sheets

(56) References Cited

U.S. PATENT DOCUMENTS

| | | | | |
|---|---|---|---|---|
| 8,386,733 B1* | 2/2013 | Tsaur | ................ | G06F 11/1458 |
| | | | | 711/162 |
| 8,484,737 B1* | 7/2013 | Swift | ................ | H04L 63/1441 |
| | | | | 709/224 |
| 8,577,845 B2* | 11/2013 | Nguyen | ............ | G06F 11/1451 |
| | | | | 707/654 |
| 8,666,944 B2* | 3/2014 | Beatty | ............... | G06F 11/1451 |
| | | | | 707/679 |
| 8,706,992 B2* | 4/2014 | Liu | ................ | G06F 3/0482 |
| | | | | 711/162 |
| 8,788,460 B2* | 7/2014 | Simek | ............... | G06F 17/3089 |
| | | | | 707/609 |
| 8,832,030 B1* | 9/2014 | Buchman | .......... | G06F 11/1451 |
| | | | | 707/650 |
| 8,903,777 B1* | 12/2014 | Searls | ............... | G06F 17/3007 |
| | | | | 707/665 |
| 9,223,661 B1* | 12/2015 | Bezbaruah | ....... | G06F 17/30073 |
| 9,489,266 B2* | 11/2016 | Palagummi | ........ | G06F 11/1469 |
| 9,495,404 B2* | 11/2016 | Kumarasamy | ..... | G06F 11/1469 |
| 9,529,806 B1* | 12/2016 | Sumant | .............. | G06F 11/1469 |
| 2005/0160118 A1* | 7/2005 | Berkowitz | ......... | G06F 11/1451 |
| 2009/0313447 A1* | 12/2009 | Nguyen | ............. | G06F 11/1451 |
| | | | | 711/162 |
| 2010/0174683 A1* | 7/2010 | Freeman | ............ | G06F 11/1435 |
| | | | | 707/650 |
| 2010/0313018 A1* | 12/2010 | Jorgensen | ................ | H04L 9/32 |
| | | | | 713/168 |
| 2012/0117342 A1* | 5/2012 | Karonde | ............... | G06F 11/1451 |
| | | | | 711/162 |
| 2013/0085999 A1* | 4/2013 | Tung | .................. | G06F 11/1451 |
| | | | | 707/654 |
| 2013/0262389 A1* | 10/2013 | Rathof | ............... | G06F 11/1464 |
| | | | | 707/642 |
| 2014/0025640 A1* | 1/2014 | Prahlad | ............ | G06F 11/1458 |
| | | | | 707/654 |
| 2014/0196037 A1* | 7/2014 | Gopalan | ............. | G06F 9/4856 |
| | | | | 718/1 |
| 2015/0378833 A1* | 12/2015 | Misra | ................ | G06F 11/1448 |
| | | | | 714/19 |

* cited by examiner

METHOD AND SYSTEM FOR PERFORMING AN ITEM LEVEL RESTORE FROM A BACKUP

FIELD OF THE INVENTION

Embodiments of the present invention relate generally to data storage systems. More particularly, embodiments of the invention relate to performing item level restore from a backup.

BACKGROUND

The ability to backup data and restore lost data is an important function of modern computer systems. However, the implementation of backup and restore functions is complex. First, the backup function has to take into account that the data being backed up may be in a state where it is currently changing. For example, at the time of backing up the data, an application creating and altering the data may be running. Thus, the data that is backed up and stored may be inconsistent with the data as seen by the user using the application. Accordingly, when a restore of the system is requested, the restored data may not be consistent with the expected state of the data (e.g., the data as seen by the user using the application).

In order to minimize the degree of inconsistency in the data being backed up, one solution would require that that the applications using the data be offline (e.g., turning off the applications that may access or modify the data) at the time of backup. However, with data sets becoming larger, taking the applications offline to perform the data backup all at one time is impractical in part due to expectations of continuous application availability and uptime.

In modern computer systems, a file system stores and organizes computer files to enable a program to efficiently locate and access requested files. File systems can utilize a storage device such as a hard disk drive to provide local access to data or to utilize a network to provide access to data stored on a remote file server over the network. A file system can also be characterized as a set of abstract data types that are implemented for the storage, hierarchical organization, manipulation, navigation, access, and retrieval of data. The file system software is responsible for organizing files and directories.

Many companies and individuals with large amounts of stored data employ a file system as a data storage system. These data storage systems can be located local to the data to be backed up or at a remote site. The data storage systems can be managed by the entity controlling the data storage devices or a data storage service company. Data can be added to the storage system at any frequency and at any amount.

Data storage systems may offer storage for backup and disaster recovery. Transfer to remote storage may require the transfer of data over a network. A local client data backup application prepares and sends data from the local file system to a backup system. The backup system stores the data received from the local client application to be utilized in the event of a corruption or failure at the computing device executing the local client data backup application.

Data storage systems may enable a user to select all databases, a segment of the databases or a single database for storage or backup. Each database may include a hierarchy of objects such as site collections, sites, documents, lists, libraries, and folders. While the backup solutions allow for a restore of the selected databases in the event of a catastrophic failure of the user's device or the user's network, the granular recovery of an item in the database such as a specific site is not supported by current backup solutions.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

As discussed herein above, data backup and data backup systems are designed to store a copy of a set of data storage systems in case of disaster recovery (DR) or similar scenarios. DR is a process of preparing for recovery or continued operation of technology infrastructure critical to an organization after a disaster that renders a computer inoperable or corrupts the data on the physical disk. One of the critical aspects of DR planning is timely recovery of data and processes following the incident. Organizations develop recovery strategies to ensure that the system downtime is minimal at best, within acceptable limits/threshold and predictable. For reducing outage time, the system should be recovered quickly and effectively following disruption. Currently, time to recover depends on the type of data and the size of critical data.

In backup systems, the backed up data is stored as a set of snapshots of the data storage system that are captured over time. Snapshots are also known as a shadow copy or a point-in-time copy. This is in contrast to 'standard' backup processes that makes a duplicate and compresses the data on the data storage system into another format on the backup system. Snapshot based backup can provide a backup with less downtime or disruption to the data storage system and that can provide a fast data recovery process. There are several types of storage snapshot systems including copy-on-write and split-mirror snapshot systems. The capacity to generate these snapshots is included in many data backup clients.

A copy-on-write snapshot creation process generates a snapshot of changes to stored data every time new data is stored or existing data is modified on the data storage system. Thus, the backup data is always up to date enabling immediate recovery of data in its most recent form in case of a failure. However, all previous snapshots from the point of failure to the last full snapshot image of the data storage system must be available for recovery.

A split-mirror snapshot process references all the data on a set of mirrored drives. Each time the process is executed, a snapshot is created of the entire volume, rather than just the changes to the volume. Having complete snapshots simplifies the process of recovering, duplicating, or archiving all the data on a drive. However, this is a slower process, and it requires more storage space for each snapshot and changes made since the last snapshot are lost.

In some embodiments, the snapshots are generated by leveraging the snapshot capabilities of either data storage system hardware/Array based capabilities (e.g., the Symmetrix or similar backup software programs) or related software based capabilities (e.g., capabilities virtualization or volume management software or similar data storage system related software). The Symmetrix system is a system of EMC Corporation of Hopkinton, Mass. A system for snapshot backups can have the following major components:

(1) a source/production host: this is the host data storage system where the production data is hosted (i.e., the data to be backed up);

(2) a source logical unit number (LUN): the source host has the production data provisioned to the source LUN (i.e., the production data is stored in a source LUN), e.g., a production host can have source LUNs coming from Symmetrix or similar data storage systems;

(3) a mount host/data mover/proxy: these are different names for the same component, this is the host system where the backup snapshots are mounted;

(4) target LUN: the mount host has the storage of the backup snapshots provisioned to the target LUN, e.g., the mount host has target LUNs coming from Symmetrix or similar data storage systems; and (5) backup server: the backup server includes a policy engine (amongst other components, which manages the backup process. Though the snapshots are handled at the data storage array or software level (dependent on the production host), the metadata information related to the snapshot backup process goes to a backup server catalog managed by the backup server; and (6) zoning: a logical grouping of data storage arrays using a set of switches, both source and mount hosts are zoned properly to associated data storage arrays using respective sets of switches.

Disadvantages of the prior art include that existing backup software only allows for a restore of an entire database in the event of a catastrophic failure, and does not allow for the granular recovery of an item included the database such as a specific site.

Figure 1:
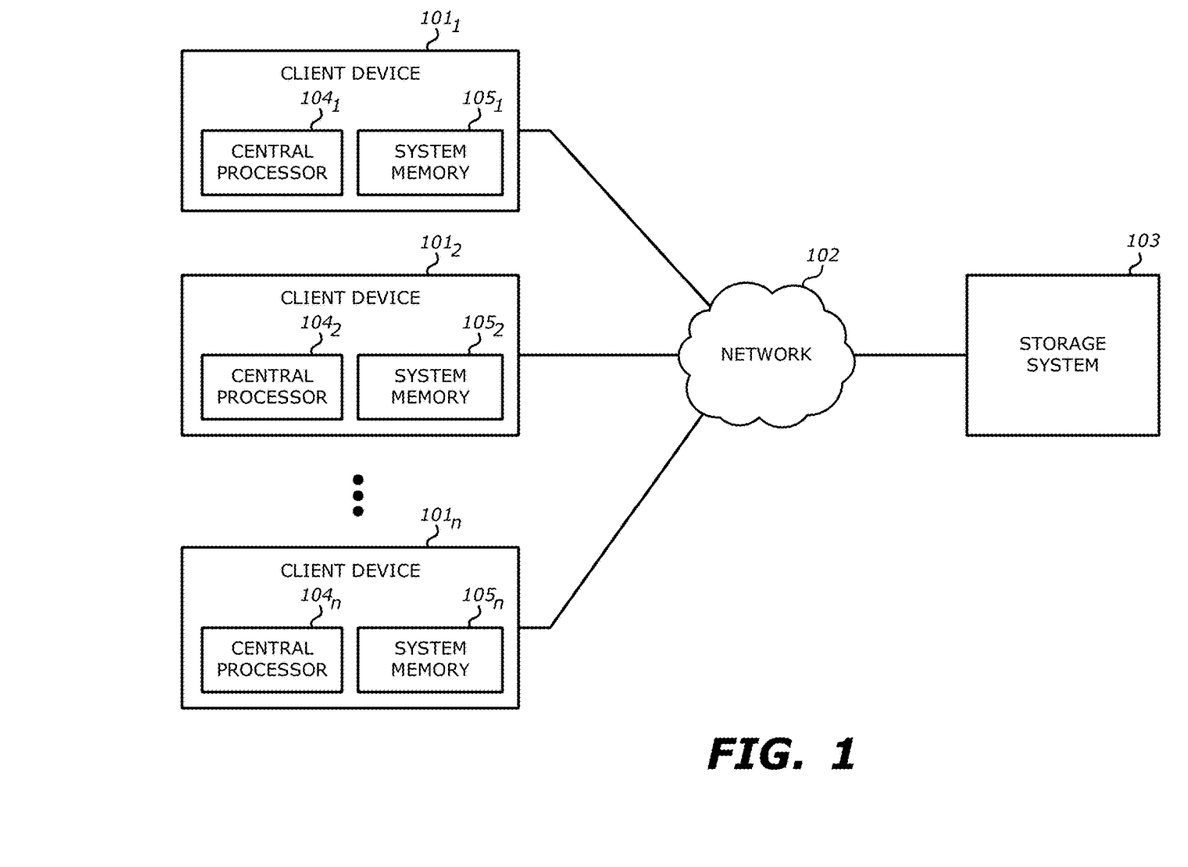
FIG. 1 is a block diagram illustrating an environment for implementing embodiments of the invention.

FIG. 1 is a block diagram illustrating an environment for implementing embodiments of the invention. The environment in FIG. 1 includes one or more client devices $101_1$-$101_n$ (n>1) communicatively coupled to backup and restore system 103 over network 102. Client devices $101_1$-$101_n$ may be any type of clients such as a server, a personal computer (e.g., desktops, laptops, and tablets), a "thin" client, a personal digital assistant (PDA), a Web enabled appliance, a gaming device, a media player, or a mobile phone (e.g., Smartphone), etc. Alternatively, any of client devices $101_1$-$101_n$ may be a primary storage system that provides storage to other local clients, which may periodically back up the content stored therein to the backup and restore system 103. Each of the client devices $101_1$-$101_n$ may respectively include a central processor $104_1$-$104_n$ and a system memory $105_1$-$105_n$. Each of the central processors $104_1$-$104_n$ may include multiple processors or a multicore processor, which may permit parallel processing of information. Each system memory $105_1$-$105_n$ may have stored therein instructions that may be executed by the central processor $104_1$-$104_n$, respectively, to cause the central processor $104_1$-$104_n$, to control its client device $101_1$-$101_n$. For instance, the system memory $105_1$ may have stored therein instructions, which when executed by the central processor $104_1$, causes the system processor $104_1$ to run an operating system for the client device $101_1$. The memory device $105_1$ may include a machine (e.g., a computer) readable storage medium (e.g., read only memory ("ROM"), random access memory ("RAM"), magnetic disk storage media, optical storage media, flash memory devices).

Network 102 may be any type of networks such as a local area network (LAN), a wide area network (WAN) such as the Internet, a fiber network, a storage area network (SAN), or a combination thereof, wired or wireless. Clients $101_1$-$101_n$ may be in physical proximity or may be physically remote from one another. Backup and restore system 103 may be located in proximity to one or neither of clients $101_1$-$101_n$.

Figure 2:
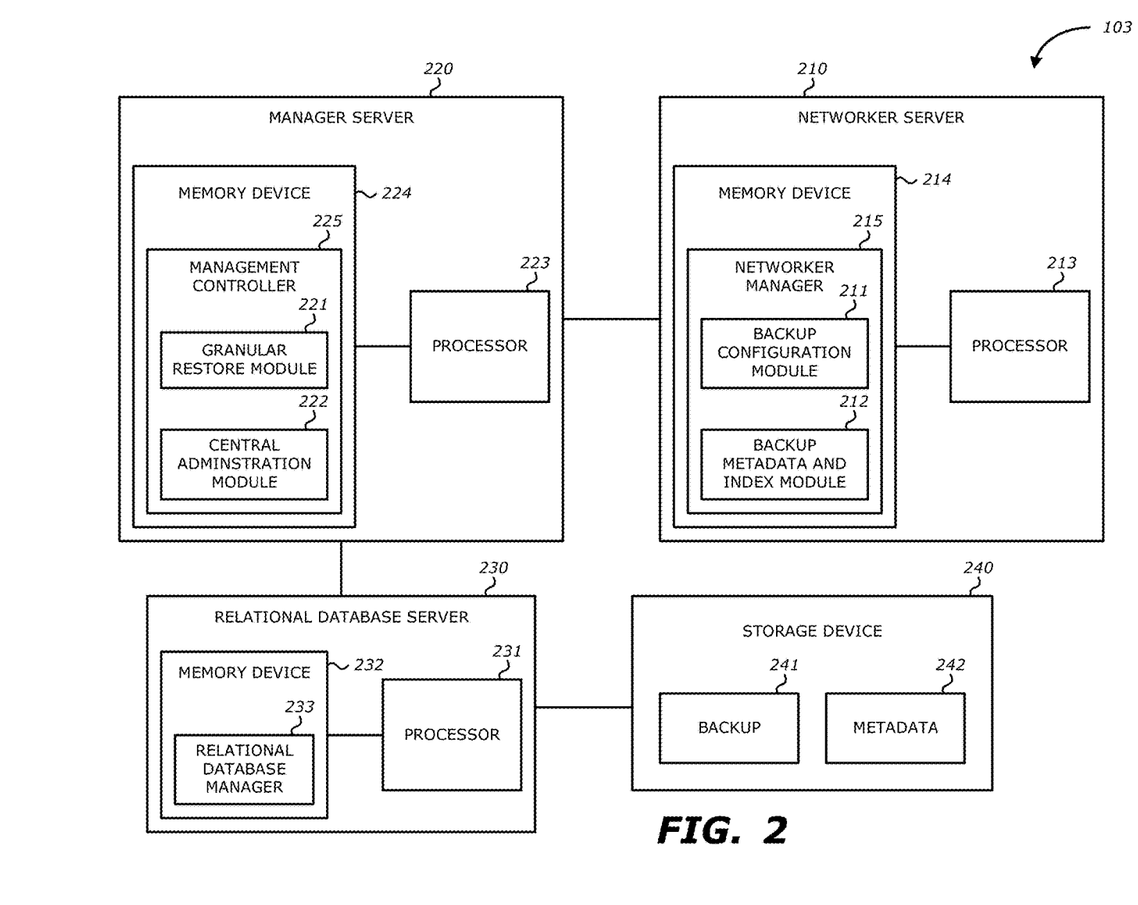
FIG. 2 is a block diagram illustrating a system for performing an item level restore from a backup according to one embodiment of the invention.

FIG. 2 is a block diagram illustrating a backup and restore system 103 for performing an item level restore from a shadow backup according to one embodiment of the invention. Backup and restore system 103 may include any type of server or cluster of servers. For example, backup and restore system 103 may be a storage server used for any of various different purposes, such as to provide multiple users with access to shared data and/or to back up data and restore data. In one embodiment, backup and restore system 103 may represent a file server (e.g., an appliance used to provide network attached storage (NAS) capability), a block-based storage server (e.g., used to provide storage area network (SAN) capability), a unified storage device (e.g., one which combines NAS and SAN capabilities), a near-line storage device, a direct attached storage (DAS) device, a tape backup device, or essentially any other type of data storage device. Backup and restore system 103 may have a distributed architecture, or all of its components may be integrated into a single unit. Backup and restore system 103 may be implemented as part of an archive and/or backup system such as a deduplicating storage system available from EMC® Corporation of Hopkinton, Mass.

In one embodiment, as shown in FIG. 2, backup and restore system 103 includes a networker server 210, a management server 220, a relational database server 230 and a storage device 240 communicatively coupled to each other.

As shown in FIG. 2, networker server 210 includes a processor 213 and a memory device 214 that are communicatively coupled. Processor 213 may include multiple processors or a multicore processor, which may permit parallel processing of information. Memory device 214 may be a non-transitory machine (e.g., a computer) readable medium to store a networker manager 215 that includes backup configuration module 211 and backup metadata and index module 212. For instance, memory device 214 may be read only memory ("ROM"), random access memory ("RAM"), magnetic disk storage media, optical storage media, flash memory devices.

Memory device 214 may have stored therein instructions that may be executed by processor 213. In some embodiments, the networker manager 215 includes a set of instructions and processor 213 may be configured to execute the networker manager 215 to control the backup configuration module 211 and backup metadata and index module 212. The networker manager 215 may be configured to use the backup configuration module 211 to schedule the backup of the client devices $101_1$-$101_n$, and to store configuration settings such as the time and the frequency of the backups. Networker manager 215 may also be configured to use the backup metadata and index module 212 to stores metadata and index associated with each of the client devices $101_1$-$101_n$. In one embodiment, backup metadata and index module 212 may be controlled or used by networker processor 213 to determine which client devices $101_1$-$101_n$ are scheduled to be backed up and monitor whether the client devices $101_1$-$101_n$ have been backed up in accordance to the backup configuration module 211's scheduling. When configurations stored in backup configuration module 211 indicate that a backup is scheduled, networker manager 215 may be configured to signal to management server 220 to start a backup to generate the shadow backup of content databases. In some embodiments, networker server 210 includes a requestor that requests creation of shadow copies (e.g., shadow backups). In other embodiments, the requestor is included in the client devices $101_1$-$101_n$ and transmits the request for creation of shadow backups to backup and restore system 103 via the network 102. In some embodiments, the requestor is a SharePoint Foundation (SPF) Volume Shadow Copy Service (VSS) requestor. As discussed above, the shadow copy is also known as a snapshot or shadow backup. For instance, the shadow copy may be a copy-on-write snapshot that includes the changes to stored state each time new data is stored or existing data is modified on the data storage system 240 or a split-mirror snapshot that includes the entire volume of data on the data storage system 240. It is noted that the management server 220 may also start a backup to generate a "standard" backup that includes a compressed duplicate the data on the data storage system in another format on the backup system. Note that, some or all of the components in networker server 210 as shown in FIG. 2 may be implemented as processing logic in software, hardware, or a combination thereof.

As shown in FIG. 2, management server 220 is coupled to networker server 210 and the relational database server 230. According to one embodiment, management server 220 includes a processor 223 and a memory device 224 that are communicatively coupled. Processor 223 may include multiple processors or a multicore processor, which may permit parallel processing of information. Memory device 224 may be a non-transitory machine (e.g., a computer) readable medium to store a management controller 225 that includes a central administration module 222 and a granular restore module 221. For instance, memory device 224 may be read only memory ("ROM"), random access memory ("RAM"), magnetic disk storage media, optical storage media, flash memory devices.

Memory device 224 may have stored therein instructions that may be executed by processor 223. In some embodiments, the management controller 225 includes a set of instructions and processor 223 may be configured to execute the management controller 225 to control a central administration module 222 and a granular restore module 221.

For instance, management controller 225 may be configured to use central administration module 222 to manage the communications between networker server 210, relational database server 230 and storage device 240. For instance, when the request for creation of a backup or a shadow backup 241 is received from networker server 210, management controller is configured to use central administration module 222 to signal to relational database server 230 to perform the backup of content modules to generate the backup or shadow backup 241. In one embodiment, generating the backup or shadow backup 241 includes backing up content databases of management server 220 in the storage device 240. In one embodiment, management server 220 may be deployed as a single box setup or a farm configuration. One example of management server 220 is SharePoint Server. Some or all of the components in management server 220 as shown in FIG. 2 may be implemented as processing logic in software, hardware, or a combination thereof.

Relational database server 230, as shown in FIG. 2, includes a processor 231 and a memory device 232 that are communicatively coupled. Processor 231 may include multiple processors or a multicore processor, which may permit parallel processing of information. Memory device 232 may be a non-transitory machine (e.g., a computer) readable medium to store a relational database manager 233. For instance, memory device 232 may be read only memory ("ROM"), random access memory ("RAM"), magnetic disk storage media, optical storage media, flash memory devices.

Memory device 232 may have stored therein instructions that may be executed by processor 231. In some embodiments, the relational database manager 233 includes a set of instructions and processor 231 may be configured to execute the relational database manager 233.

Relational database server 230 includes a writer that ensures that the data being backed up is consistent. For instance, the relational database manager 233 may be configured to control the writer to create, update and administer relational databases included in relational database server 230. The relational databases may be stored in the memory device 232. Some or all of the components in relational database server 230 as shown in FIG. 2 may be implemented as processing logic in software, hardware, or a combination thereof. In one embodiment, relational database server 230 may be SQL Server and the writer may be SPF VSS Writer. The SPF VSS Writer is a referential writer that is further dependent on the SQL Server VSS Writer and SPF Search Writer. In one embodiment, relational database manager 233 is configured to provide the requestor with a list of servers, databases, and files associated with the farm included in management server 220. The list is returned to the requestor so that the backup can be run on the location where the database is physically located. The writer enables the requestor to select one or more of the databases for backup and restore operations. Accordingly, the backup or the shadow backup allows for a disaster restore where entire databases or the entire farm need to be restored. For instance, when the shadow backup is a copy-on-write snapshot, all the previous snapshots from the point of failure to the last full snapshot image of the databases or farm are used to recover the entire databases or entire farms. When the shadow backup is a split-mirror snapshot, the shadow backup is created for an entire volume such that using the split-mirror snapshot for recovery allows for a restore of an entire volume. Similarly, for the standard backup, the compressed duplicate of the data on the data storage system is used to restore the entire data on the data storage system. Referring back to FIG. 2, relational database manager 233 is configured to use the granular restore module 221 to allow for users to perform a restore of a granular item included in a content database of a backup or a shadow backup 241. A granular item includes, for example, a site collection, a site, a document, a list, a library, a folder, etc. In one embodiment, when a user selects a content database from a shadow backup 241 stored in storage device 240 for performing granular restore, relational database manager 233 is configured to use granular restore module 221 to coordinate with relational database server 230 to perform a restore of a granular item included in the selected content database as described below.

In FIG. 2, storage device 240 stores the backed up data from management server 220 as a backup 241 and/or a shadow backup 241. The backup 241 or shadow backup 241 includes the content databases from management server 220. In one embodiment, content databases include a hierarchy of objects including site collections, sites, documents, lists, libraries and folders. The content databases may be SharePoint content databases. Storage device 240 may also store metadata 242 associated with each of the granular items included in the content database such as an identification of the owner, the permission, the date of creation, the date of modification, versions, etc.

While FIG. 2 illustrates a single storage device 240, it is understood that some embodiments may include a plurality of storage devices 240. Storage device 240 may be implemented locally (e.g., single node operating environment) or remotely (e.g., multi-node operating environment) via interconnect, which may be a bus and/or a network (e.g., a storage network or a network similar to network 102). Storage device 240 may include a single storage device such as a hard disk, a tape drive, a semiconductor memory, a plurality of storage devices such as a redundant array system (e.g., a redundant array of independent disks (RAID)), a system for storage such as a library system or network attached storage system, or any other appropriate storage device or system.

Figure 3:
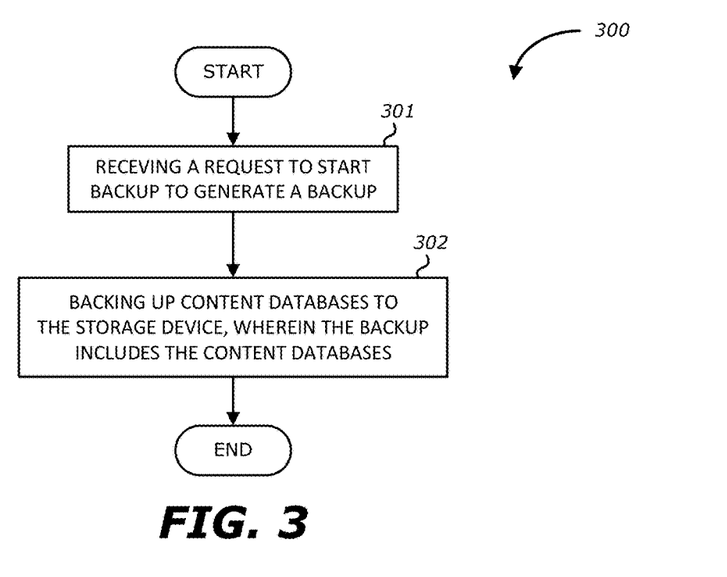
FIG. 3 is a flow diagram illustrating a process of creating a backup from which the item level restore is performed according to one embodiment of the invention.
Figure 4:
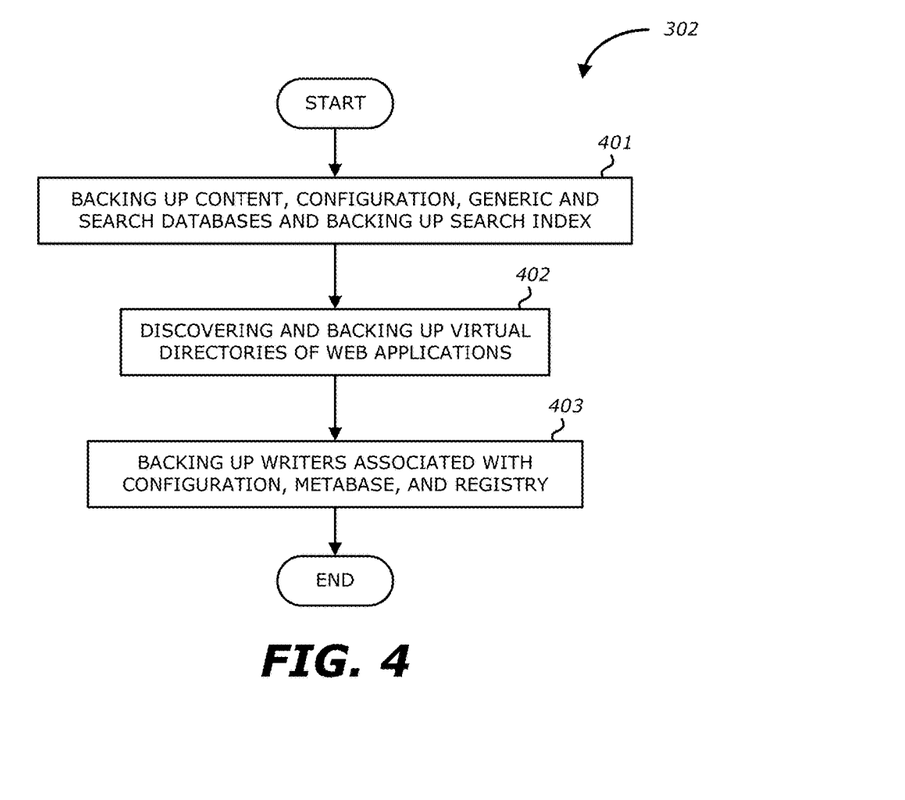
FIG. 4 is a flow diagram illustrating details of the backing up of content databases step from FIG. 3 according to one embodiment of the invention.

FIG. 3 is a flow diagram illustrating a process 300 of creating a backup from which the item level restore is performed according to one embodiment of the invention. The process 300 starts at Block 301 with the system 100 receiving a request to start backup to generate a backup. In one embodiment, the networker server 210 sends the request to start backup to the management server 220. At Block 302, the system 100 backs up content databases to the storage device 240 to generate the backup that includes the content databases. Referring to FIG. 4, a flow diagram illustrating details of the backing up of content databases from Block 302 of FIG. 3 according to one embodiment of the invention is shown. The backing up of content databases from Block 302 starts at Block 401 by backing up the content, configuration, generic and search databases using a SharePoint Foundation (SPF) writer server 330 and by backing up search index using a search writer. In one embodiment, in Block 301, the SQL VSS Writer will backup SharePoint Content, Configuration, Generic and Search Databases using structured query language (SQL) VSS Writer, and backup search index using OSearch15 VSS Writer. At Block 402, SharePoint Server discovers and backs up the virtual directories of web applications using application programming interfaces (APIs). In one embodiment, in Block 402, the SharePoint Server discovers and backs up the "Internet Information Services (IIS) Virtual Directories" of the SharePoint Web Applications using SPF APIs. At Block 403, the SharePoint server 230 backs up writers associated with IIS configuration, IIS metabase, and registry. In one embodiment, the SharePoint server backs up the other three writers associated with SharePoint "IIS Config Writer," "IIS Metabase Writer," and "Registry Writer."

Figure 5:
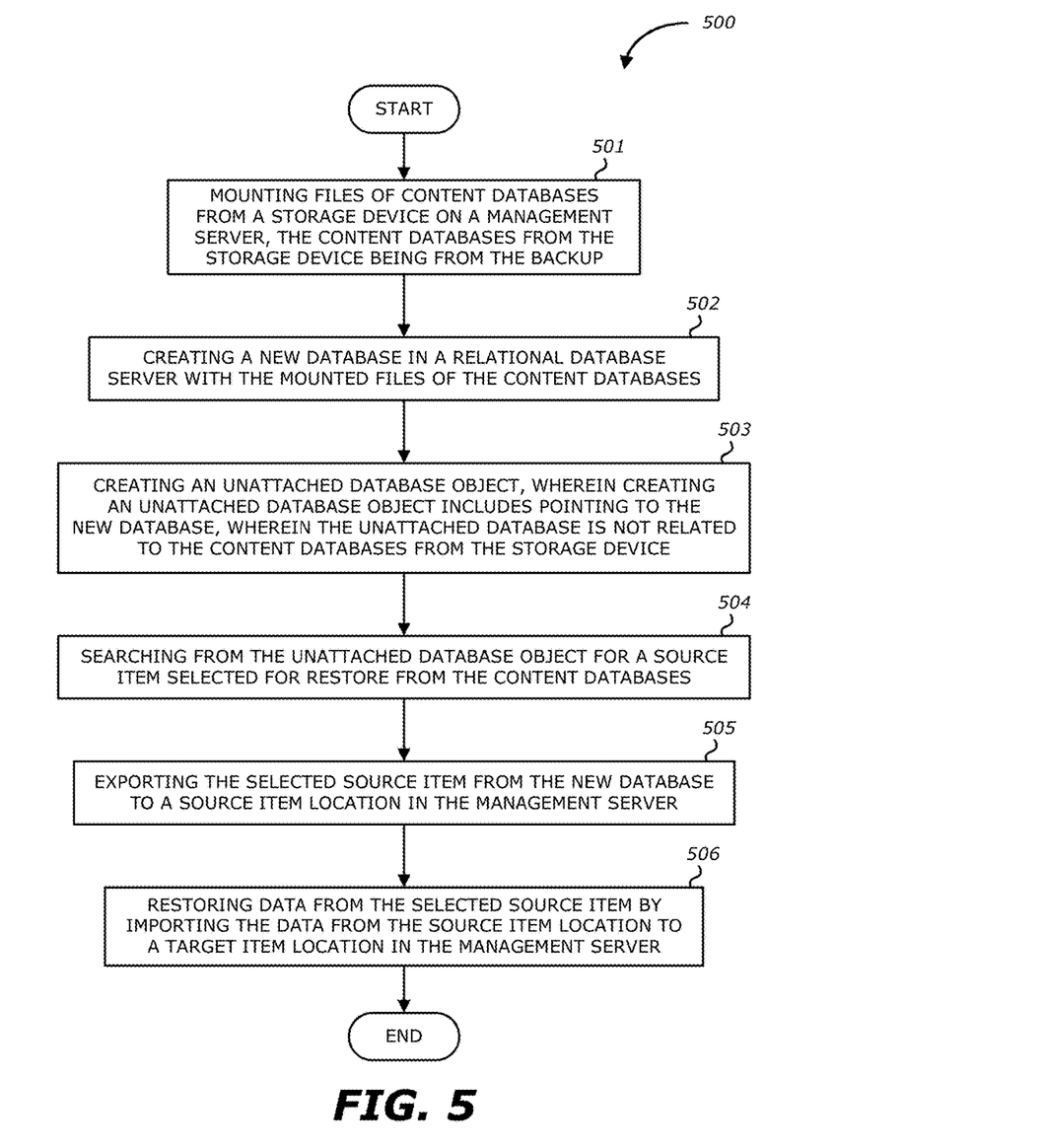
FIG. 5 is a flow diagram illustrating a process of performing an item level restore from a backup according to one embodiment of the invention.

FIG. 5 is a flow diagram illustrating a process 500 of performing an item level restore from a backup according to one embodiment of the invention. The user may select a content database from the backup for performing granular restore. In one embodiment, management server 202 may receive a database selection from a user for granular restore indicating one of the plurality of content databases. The process 500 may start with mounting files of content databases from a storage device 240 on the management server 220 at Block 501. The content databases from the storage device 240 are from the backup that was stored in the storage device 240 from a previous backup. The files of the content databases that are mounted on the management server 220 may be provided to the user via access to the central administration module 222 or via a web front end. In one embodiment, the files from SharePoint Content Databases from the SPF VSS backup are mounted on the SharePoint server. At Block 502, a new database is created in the relational database server 230 with the mounted files of the content databases. In one embodiment, creating the new database in the relational database server 230 includes providing read and write access to the mounted files of the content databases and providing searching functions of items included in the mounted files of the content databases.

The user may search for an item to restore from the selected backed up content database. In one embodiment, a search query is received from the user that includes a source item from the content databases. At Block 503, an unattached database object is created using the new database. In one embodiment, the creating of an unattached database object includes pointing to the new database. In one embodiment, the unattached database object is created with a call to the status CreateUnattachedContentDatabase( ) method. The unattached database is not related to the content databases from the storage device 204. In one embodiment, the unattached database is not related to (or unattached to) the content databases included in the SharePoint farm included in management server 220. At Block 504, searching from the unattached database object for a source item selected for restore from the content databases. In one embodiment, the SPF object model is used to traverse or search the selected source item from the unattached database object. The selected source item may be a granular item included in the content database that may be one of a site collection, Web sites, lists, list items, or fields.

The user may select the source item that the user wishes to restore. In one embodiment, the source item selected for restore from the content databases is received from a user. At Block 505, the selected source item is exported from the new database to a source item location in management server 220. The selected source item includes the metadata associated with the selected source item. In one embodiment, when the user selects the source item (e.g., the granular item for restore), the source item is exported or retrieved from the new database using SharePoint deployment APIs. In one embodiment, the SPExportSettings are configured to include a configuration to the UnattachedContentDatabase property, which is specific to exporting from the new database that is not attached to the SharePoint farm.

The user may select a target item for the restore of the granular item. In one embodiment, management server 220 receives from the user the target item location in the management server 220. For instance, the target item location may be a folder to which a document (e.g., the source item for restore in Block 505) is to be restored or a site to which a list (e.g., the source item for restore in Block 505) is to be restored. At Block 506, the management server 220 may restore the data from the selected source item by importing the data from the source item location to a target item location in the management server 220. In one embodiment, when a user selects a target SharePoint object for restore/modification (e.g., a target item location), SharePoint deployment APIs are used to import the SharePoint data from the folder to which the source object was exported in Block 505.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method for performing an item level restore from a backup comprising:
   mounting files of content databases from a storage device on a management server, the content databases from the storage device being a shadow copy from the backup which is created in response to a request for restore;
   creating a new database in a relational database server with the mounted files of the content databases, wherein creating the new database in the relational database server includes providing read and write access to the mounted files of the content databases and providing searching functions of items included in the mounted files of the content databases;
   creating an unattached database object, wherein creating an unattached database object includes pointing to the new database, wherein the unattached database object is not related to the content databases from the storage device;
   searching from the unattached database object for a source item selected for restore from the content databases;
   exporting the selected source item and a metadata associated with the selected source item from the new database to a source item location in the management server, wherein the selected source item is a granular item from the content databases, and wherein the associated metadata identifies at least an owner, a permission, a data of creation, or a date of modification of the selected source item;
   receiving by the content management server a request to start backup to generate the backup; and
   backing up content databases to the storage device by the relational database server, wherein backing up the content databases includes:
      backing up content, configuration, generic and search databases, and search index,
      discovering and backing up virtual directories of web applications, and
      backing up writers associated with configuration, a metabase, and a registry.

2. The method of claim 1, further comprising:
   receiving a database selection from a user for granular restore indicating one of the plurality of content databases;
   receiving a search query from the user including a source item from the content databases;
   receiving from the user the source item selected for restore from the content databases;
   receiving from the user the target item location in the management server; and
   restoring data from the selected source item by importing the data from the source item location to a target item location in the management server.

3. The method of claim 1, wherein the selected source item includes at least one of: a site collection, a Web site, a list, a list item, or a field.

4. A non-transitory computer-readable storage medium having stored thereon instructions which, when executed by a processor, causes the processor to perform a method for performing an item level restore from a backup, the method comprising:

mounting files of content databases from a storage device on the management server, the content databases from the storage device being from a shadow copy of the backup which is created in response to a request for restore;

creating a new database in a relational database server with the mounted files of the content databases, wherein creating the new database in the relational database server includes providing read and write access to the mounted files of the content databases, and providing searching functions of items included in the mounted files of the content databases;

creating an unattached database object, wherein creating an unattached database object includes pointing to the new database, wherein the unattached database object is not related to the content databases from the storage device;

searching from the unattached database object for a source item selected for restore from the content databases; and exporting the selected source item and a metadata associated with the selected source item from the new database to a source item location in the management server, wherein data from the selected source item is restored by the management server by being imported from the source item location to a target item location in the management server wherein the selected source item is a granular item from the content databases, and wherein the associated metadata identifies at least an owner, a permission, a data of creation, or a date of modification of the selected source item;

receiving a request to start backup to generate the backup; and backing up content databases to the storage device, wherein backing up the content databases includes:
 backing up content, configuration, generic and search databases, and search index,
 discovering and backing up virtual directories of web applications, and
 backing up writers associated with configuration, a metabase, and a registry.

5. The computer-readable storage medium of claim 4, wherein the selected source item includes at least one of: a site collection, a Web site, a list, a list item, or a field.

* * * * *